May 4, 1937. E. G. OVERLY 2,079,332
WIRE PLANT SUPPORT
Filed June 25, 1936
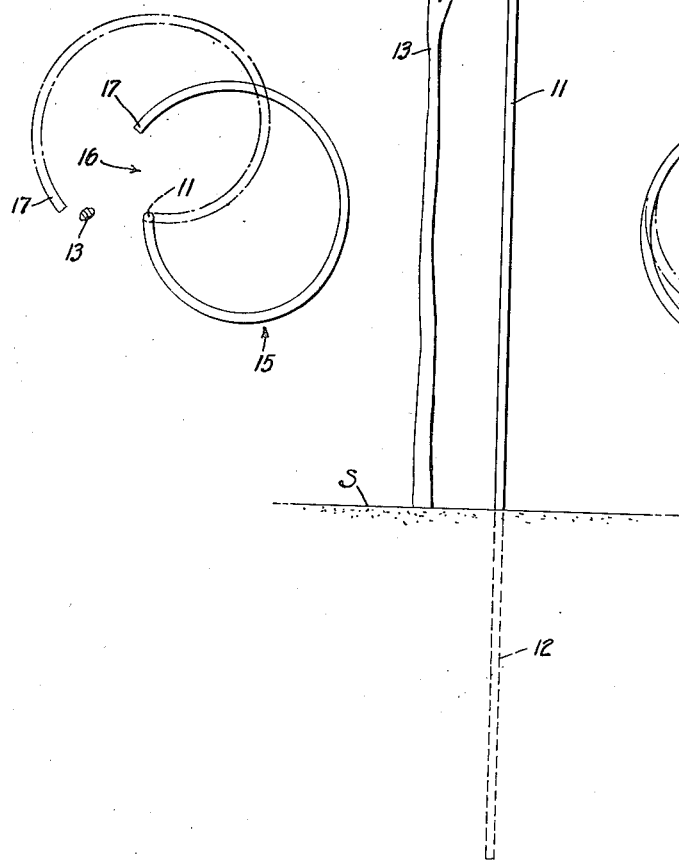
INVENTOR.
Elmer G. Overly
BY Moses & Nolte
ATTORNEYS Patented May 4, 1937

2,079,332

UNITED STATES PATENT OFFICE 2,079,332

WIRE PLANT SUPPORT

Elmer G. Overly, Greensburg, Pa.

Application June 25, 1936, Serial No. 87,171

5 Claims. (Cl. 47—47)

This invention relates to a plant-support, especially to a support of the class formed of wire and intended for the individual support of a single plant having one or more stalks, and more particularly to a support of the class in which a single piece of wire is bent to form a post provided with a loop to be used for attachment to the plant, and for support thereof.

Among the requirements to be satisfied desirably by such a one-piece plant-support, and the provision for which is among the objects of my present invention, is that the device shall have a shank adapted for insertion readily into the soil adjacent to the stalk of a plant to a depth adequate to insure stability of the device under the lateral strain created by movement of the stalk sidewise when blown by the wind or weighted by rain or by water applied to the plant; also that the device shall be self-contained, not requiring the use of string by which to effect the attachment or support of the plant thereby.

In such one-piece wire supports as have been proposed heretofore none of the structures provided has completely satisfied the above requirements, and each has exhibited defects in one or more important particulars, so that these devices have not attained the general employment warranted by the demand for a simple, easily manipulated and inexpensive plant prop.

Among the defects in these earlier devices, which have militated against their general adoption, may be mentioned the employment, in some, of weighted bases made of lead or other heavy material, to afford a means for holding the supporting post in an upright position. This provision is adequate only for use with small plants; it is entirely ineffective to withstand outdoor wind pressures on any plants; and it is not altogether satisfactory even for use on florists' tables or benches, for the reason that the bases are clumsy, take up too much space, and interfere with watering and cultivation of the soil near the stalk of the plant, nor is this form available for use with a potted plant.

In one form of plant prop employing a wire post to be inserted in the soil, and having an attachment loop, the loops are disposed in vertical planes, and the attachment is effected exclusively by strings.

In another form of all wire device of the inserted post type, reliance is had upon a system of overhead strings, such as florists employ conventionally in hot-houses, to provide against displacement laterally of the wire loops encircling the stalks, so that the device does not satisfy the stipulation that it shall be self-sustaining, and is necessarily unduly complicated in its overhead extensions provided for engagement with the system of strings.

In another form of one-piece wire plant-prop, the structure of the loop is designed expressly to be engaged with the stalk prior to forcing the lower end of the prop into the ground. This is attended by serious disadvantages when use is to be made of a long prop, as the manipulation of the prop and loop at an angle to the stalk is always awkward, even for an experienced gardener, and is likely to injure the substance of a tender stalk, a contingency which is aggravated by lack of skill in the average user of such devices.

Under such conditions, it is a more specific object of my invention to provide a one-piece wire plant support comprising a straight, upright shank portion of suitable length to be inserted into the ground to a depth adequate to maintain the support in erect position under all outdoor conditions encountered in ordinary usage, and with an integral extension above ground of a length adequate to provide for the support of the stalks of plants of various heights, at the proper height above ground, without impairment of the stability of the inserted portion; also to provide this upright standard with an integral whorl bent from the upper end of the standard in a transverse plane, and having a volute form with a gap between the free end of the whorl and the standard, the gap having an opening greatly in excess of the diameter of the stalk, so that when the shank is inserted in the ground at a distance from the stalk less than the width of the gap, the whorl may be revolved bodily, by simple rotation of the shank, into a position in which the stalk is substantially surrounded by the whorl, without the need for direct engagement of the stalk during said emplacement.

By this provision is avoided any need for pushing the whorl down over the leafy part of the plant or for pressing inward its branches, or otherwise handling its tender portions more than is required.

The invention has for a further object the provision of a whorl of somewhat deformable character, so that it may, if desired, be readily bent manually, after such emplacement, to complete the confinement of the stalk, without the danger of injury to the stalk by unintended contact therewith.

Other objects and advantages of the invention will appear as the description of the particular physical embodiment selected to illustrate the invention progresses.

In the accompanying drawing, like characters of reference have been applied to corresponding parts throughout the several views which compose the drawing, in which:

Fig. 1 is a view in side elevation of a plan support in the construction of which the present invention has been embodied, shown in assembly with a plant to be supported, and indicating, by dotted lines, a position occupied by the head of the device in course of emplacement;

Fig. 2 is a detail view in horizontal section taken on the line 2—2 of Fig. 1, illustrating, in full lines and dotted lines respectively, certain positions assumed by the head while being revolved in the course of emplacement;

Fig. 3 is a detail view, similar to Fig. 2, being taken on the same horizontal plane, and illustrating, in full lines and dotted lines respectively, the final position of the head of the device, and an alternative position to which it may be bent, selectively.

In a now-preferred embodiment of the invention selected for illustration and description, the part designated by the reference character 11 is a piece of wire constituting the shank or standard of a plant-supporting device, of sufficient length to be inserted into the soil S to a depth adequate, as indicated at 12, to insure a sturdy resistance to wind and other stresses in use, while permitting extension of the above-ground portion, as 11, to the proper height to afford support to the stalk 13 of a plant of given height.

At the upper end of the shank 11, as at 14, the wire is bent in a transverse plane to form a whorl 15 of volute shape, having at 16 a gap exceeding considerably in extent the thickness of the stalk 13, so that when the shank 11 is thrust into the ground alongside of the stalk 13, at a distance therefrom less than the width of the gap 16, i. e., the distance between the shank 11 and the free end 17 of the volute whorl, the device will be entirely out of contact with the stalk, this being the dot and dash line position in Fig. 1 and the position illustrated in full lines in Fig. 2.

Then the whorl 15 can be revolved, by simple rotation of the device around the upright axis defined by the shank 11, past the position indicated in dotted lines in Fig. 2, illustrating how the free end 17 clears the stalk 13 in the course of such movement, which is continued until the whorl 15 occupies the position shown in full lines in Fig. 3, where the stalk 13 is nearly surrounded by the whorl, but still out of contact therewith.

If desired, the whorl may then be bent manually to complete the confinement of the stalk, as shown in dotted lines in Fig. 3, and for this purpose the metal of the whorl may have a suitable deformable characteristic. This may be readily provided for by suitable tempering of the metal of the wire locally at the whorl, while maintaining a more rigid characteristic in the shank, etc., so as to provide a sturdy support for the plant.

From the foregoing it will be seen that the device as illustrated and described satisfies all of the first-stated requirements for a plant-support of general utility, but it will be also understood that the structure disclosed does not exhaust the possible physical embodiments of the idea of means underlying the invention.

I have described what I believe to be the best embodiments of my invention. I do not wish, however, to be confined to the embodiments shown, but what I desire to cover by Letters Patent is set forth in the appended claims.

I claim:

1. A plant-support of the class described, consisting of a single piece of wire having an upright shank portion and a stalk-confining substantially horizontal uniplanar whorl portion bent in volute formation from the upper end of said shank and terminating in a free end disposed with a gap between said terminal and the axis of the shank considerably in excess of the thickness of the stalk to be confined, being adapted for insertion into the soil alongside of the stalk, and for revolution of the whorl thereafter to confine the stalk while free from contact therewith.

2. A plant-support consisting of a single piece of wire characterized by the shank portion and whorl combined and co-operating as set forth in claim 1, and having said whorl provided with a deformable characteristic to permit manual deformation of its free end to close the gap.

3. A plant-support consisting of a single piece of wire having an upright shank portion and a stalk-confining substantially horizontal uniplanar whorl portion bent in volute formation, being adapted for insertion into the soil alongside of the stalk, to its final depth, prior to confinement of the stalk, and adapted to be turned thereafter to confine the stalk by a movement exclusively in revolution of the whorl, thereby avoiding any need for pushing the whorl down over the leaves and branches.

4. A plant-support of the class described, comprising a straight upright shank portion made of a piece of wire of suitable length to be inserted into the ground to a depth adequate to maintain the support in erect position, and with an integral extension above ground adequate for adjustment vertically in conformity with the stalks of plants varying considerably in height, said wire component having an integral stalk-surrounding whorl bent from the upper end of said shank and disposed in substantially a plane transversely of the axis of the shank, said whorl being of initially volute contour, terminating in a free end removed from the upright axis by a gap greatly in excess of the thickness of the stalk to be surrounded, so that when inserted in the ground at a distance from said stalk less than the width of said gap the whorl may be revolved bodily, by simple rotation of the shank, into a position in which the stalk is approximately surrounded by the whorl, and the free end may then be readily bent to close the gap and thus to complete the confinement of said stalk, without the danger of injury to the stalk by unintended contact therewith.

5. A plant support consisting of a single piece of wire characterized by the shank portion and whorl combined and co-operating as set forth in claim 1, and having said whorl formed as a volute increasing in radius progressively from its connection with said shank to its free extremity.

ELMER G. OVERLY.